United States Patent [19]

Huang

[11] Patent Number: 5,321,512

[45] Date of Patent: Jun. 14, 1994

[54] GHOST SIGNAL CANCELLATION SYSTEM USING FEEDFORWARD AND FEEDBACK FILTERS FOR TELEVISION SIGNALS

[75] Inventor: Jinshi Huang, San Jose, Calif.

[73] Assignee: Zoran Corporation, Santa Clara, Calif.

[21] Appl. No.: 60,374

[22] Filed: May 7, 1993

[51] Int. Cl.$^5$ .............................................. H04N 5/21
[52] U.S. Cl. ...................................... 348/607; 348/614
[58] Field of Search ................ 358/167, 37, 166, 905; H04N 5/213, 5/21

[56] References Cited

U.S. PATENT DOCUMENTS

| | | | |
|---|---|---|---|
| 4,897,725 | 1/1990 | Tanaka | 358/167 |
| 5,117,291 | 5/1992 | Fadavi | 358/167 |
| 5,121,211 | 6/1992 | Koo | 358/167 |
| 5,196,936 | 3/1993 | Kobayashi et al. | 358/905 |

FOREIGN PATENT DOCUMENTS 0190428  11/1982  Japan .................................. 358/167

Primary Examiner—Victor R. Kostak
Assistant Examiner—Chris Grant
Attorney, Agent, or Firm—Townsend and Townsend Khourie and Crew

[57] ABSTRACT

Disclosed is a television ghost cancellation system based on digital filtering. A baseband video signal at the output of the demodulator is lowpass filtered before being digitized at an analog-to-digital converter. The signal is then processed in digital filters to remove the ghosts. The clean digital signal is then passed to a digital-to-analog converter and lowpass filter to become a clean baseband video signal. The digital filters consist of a feedforward section and a feedback section. The coefficients of the digital filters are calculated by digital signal processor, which processes the data stored in First-In-First-Out buffers (FIFOs). The FIFOs are used as outputs, while one FIFO is used as input to the feedback section. The FIFO stores the standard ghost canceler reference (GCR) signal. Switches are controlled by a synchronization separation circuitry. The coefficients of the feedforward section are estimated by processing data stored in the FIFO. The coefficients of the feedback filter are estimated by adapting a virtual finite impulse response (FIR) filter, which processes data stored in the FIFOs. A scheme is provided to optimize the adaptation process. The advantages of this system are stability and efficiency of the feedback section, fast cancellation and small residuals after convergence.

8 Claims, 5 Drawing Sheets

GHOST SIGNAL CANCELLATION SYSTEM USING FEEDFORWARD AND FEEDBACK FILTERS FOR TELEVISION SIGNALS

BACKGROUND OF THE INVENTION

This invention relates generally to television signal processing circuitry, and more particularly the invention relates to circuitry for ghost signal cancellation in television signals in all broadcasting standards and in HDTV.

Echo signals or ghost signals have been one of the major problems in modern television transmission. When a transmitted signal is received from the air, ghosts can be caused by reflections from mountains, buildings, and the like. In a television signal received through cable, the ghosts can be due to discontinuities of the connectors. Although the ghosts are generated in a radio frequency spectrum, the process in which the ghost is created can be accurately modelled as a linear distortion in a baseband signal. Therefore, cancelling the ghosts can be accomplished by passing the baseband signal through a linear filter which is an inverse of the linear model of the ghosting process.

Prior efforts in eliminating ghosts used analog technology such as a charge coupled device (CCD) transversal filter which did not produce significant improvement due to inaccuracy of the filter. More recently, a ghost canceller reference (GCR) signal has been proposed for use in training of filters. Digital filters have become widely accepted as alternative methods to implement the ghost cancellers.

Ghost signals can arrive at a receiver before and after the main signal, resulting in a precursor ghost and postcursor ghost, respectively. A filter to cancel the precursor ghost is a physically non-realizable infinite impulse response (IIR) filter, which can be approximated by a longer finite impulse response(FIR) filter. The post-cursor ghost can be cancelled by an IIR filter. Therefore, the typical digital filter to cancel the ghost signals is an FIR feedforward filter followed by an IIR feedback filter.

In order to calculate the filter coefficients, a ghost canceller reference (GCR) signal is transmitted from the broadcasting station, typically in one line of the vertical blanking interval (VBI). The coefficient of the filters can be estimated by comparing the received GCR signal with a stored standard GCR signal. In order to cancel the unknown ghosts, the filters have to be able to adapt to different situations. Adapting the feed-forward section is straightforward since well-known algorithms such as the mean squared error (MSE) algorithm or zero forcing (ZF) algorithms can be used to estimate the FIR filter coefficients. However, adapting the feedback filter coefficients directly using the same algorithms can result in an unstable filter. Although a stability check to abandon an unstable filter while designing another filter, this involves a significant amount of extra computations and may end up to a suboptimal solution.

Accordingly, a primary object of the present invention is a stable television ghost cancellation system including a feed-forward filter and a feedback filter with a stable and optimal adaptation of the feedback section of the ghost canceller.

SUMMARY OF THE INVENTION

In accordance with the invention, coefficients of the feedback section of a ghost canceller circuit are estimated through use of a virtual FIR filter. The coefficients of the virtual FIR filter are estimated by comparing the output of the feed-forward section with the output of the virtual filter, to which a stored reference signal is applied. Since this technique updates the FIR filter, the resulting feedback filter will be much more stable than one estimated by adapting the feedback section itself, as in existing designs. So long as the adaptation step size is small enough, the resulting feedback filter is necessarily stable. By arranging switches of the ghost canceller data path, the method calculates the response of the virtual filter, which is needed to estimate the coefficients of the virtual filter, by feeding the stored standard GCR signal to the feedback section and collecting the output therefrom. This arrangement reduces significant amounts of computations and makes the adaptation scheme have an equivalent computational complexity as those methods which adapt the feedback section directly. Thus, the adaptations of the feed-forward and feedback sections are controlled so that the coefficients of the filters are updated efficiently, whereby maximal ghost reduction can be attained with fastest speed.

The invention and objects and features thereof will be more readily understood from the following detailed description and appended claims when taken with the drawing.

DESCRIPTION OF ILLUSTRATIVE EMBODIMENTS

Figure 1:
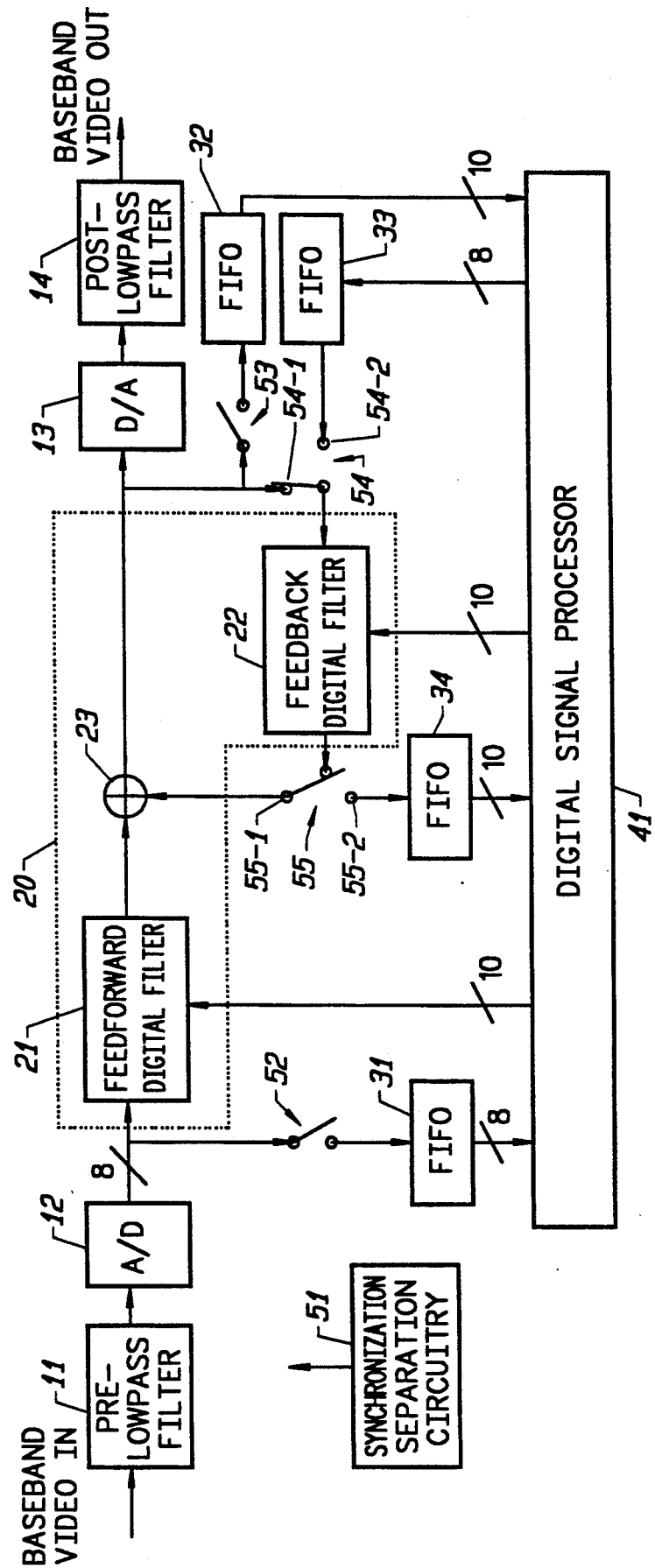
FIG. 1 is a functional block diagram of ghost cancellation circuitry in accordance with the invention.

Referring now to FIG. 1, a television ghost cancellation system in accordance with the invention is functionally illustrated. The baseband video signal taken at the output of a signal demodulator (not shown) is applied to a lowpass filter 11 and an analog to digital convertor 12. The baseband signal band width is about 4.5 MHz, therefore the sampling frequency is chosen to be 14.3 MHz. The lowpass filter 11 eliminates aliasing effects in the analog baseband video signal prior to digital conversion. The digital baseband signal is then passed through a ghost cancelling network 20 including a feed-forward digital filter 21, a feedback digital filter 22, and a summing network 23. After ghost filtering, the digital signal is converted back to an analog signal by D/A converter 13 and post lowpass filter 14.

The ghost cancelling filter 20 is controlled by a digital signal processor (DSP) 41. In order to calculate the filter coefficients, a ghost canceller reference (GCR) signal has to be transmitted from the broadcasting station. Typically, the GCR signal will be in one line of the vertical blanking interval (VBI). The illustrative embodiment of FIG. 1 complies with the Japanese Broadcasting Technology Association (BTA) standard, and extensions of the circuitry to meet other standards is straightforward. The shape of the GCR signal will affect the performance of the ghost canceller circuitry.

Signals at various locations in the circuitry are captured by synchronization separation circuitry 51 controlling switches 52, 53, 54, and 55 with the signals stored in first-in first-out (FIFO) buffers 31, 32, and 34. An interrupt is generated when these data are ready and then the data are transferred to the DSP 41 for processing. Filter coefficients are then estimated based on these data.

Figure 2:
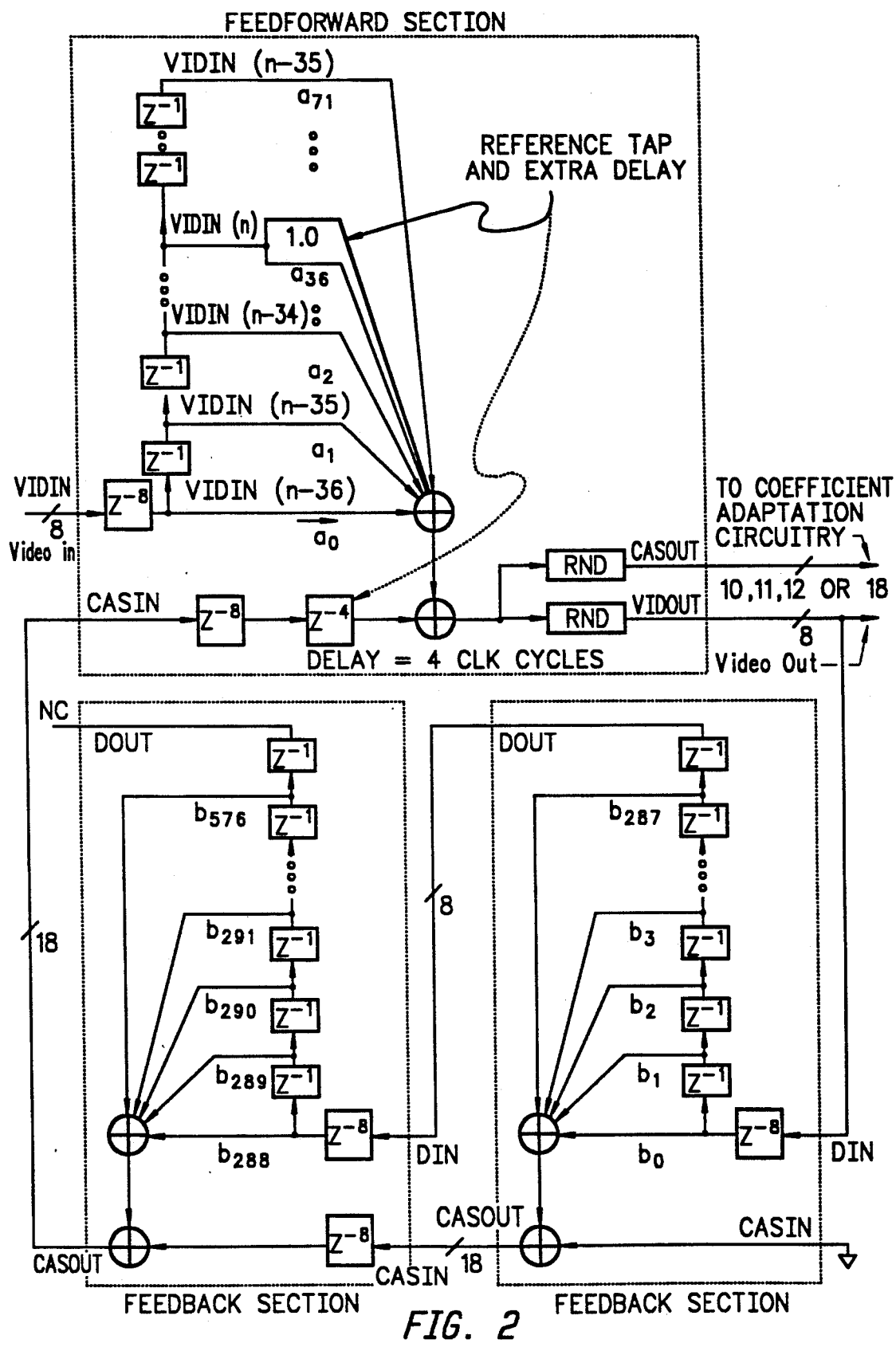
FIG. 2 is a more detailed diagram of the feed-forward and feedback digital filters in the circuitry of FIG. 1.

In one embodiment, the programmable digital filter 20 includes a 72 tap feed-forward section 21 and a 576 tap feedback section 22. The 36th tap in the feed-forward section 21 is taken as a reference position. This filter configuration can cancel from precursor ghosts with −2.5 microseconds advance through post-cursor ghosts with 42 microseconds delay. FIG. 2 shows the structure of the digital filters. As noted above, the feedforward section 21 has 72 taps with the 36th tap having a hard wired coefficient of 1.0 which is used as the reference tap. The feedback filter includes two circuit chips with each having 288 taps. Each chip has a latency of 8 clock cycles due to its pipeline configuration. One input of the feedforward section is eight-bit data from the A/D converter 12 (VIDIN), the other input to the feedforward filter is the eighteen-bit data from the output of the second chip of the feedback filter 22 (CASIN). The wide data width provides higher resolution for the filter. The CASIN input also has eight clock cycle latency. In addition, there is an extra delay of four clock cycles so that the output of the overall feedback section will be 28 clock cycle delay with respect to the reference tap ($8+8+8+4=28$).

The feedforward section 21 has two outputs including one 8-bit output going to the D/A converter 13 and as an input to the first chip of the feedback filter 22. The other output is used for the coefficients adaptations and can have variable resolutions (e.g., 10-, 11-, 12-, 18-bit options).

Figure 3:
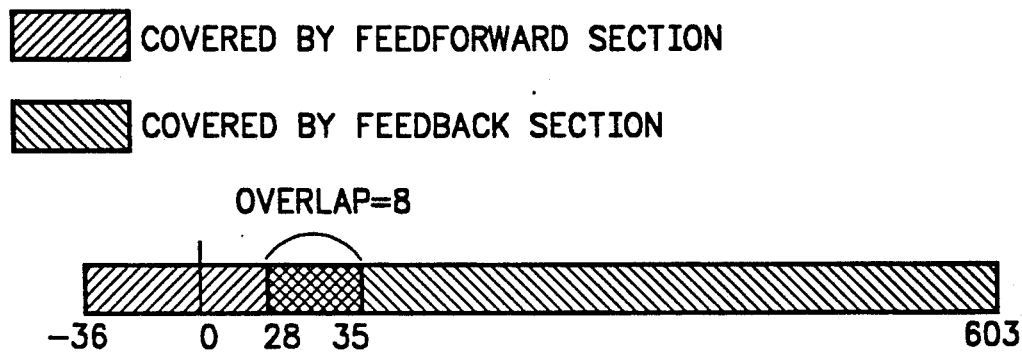
FIG. 3 illustrates schematically the signal portions acted on by the feed-forward and feedback filters of FIG. 2.

In this configuration of the ghost cancelling filter with the 36th tap of the feedforward filter functioning as a reference position, the filter can span from the −36th sample to the 603rd sample, as shown in FIG. 3. When the sampling frequency is equal to 14.3 MHz, this arrangement will detect any ghosts in the range of −2.5 microseconds advance to 42 microseconds delay. From FIG. 3 it can be seen that the feedforward filter is responsible for cancelling precursor ghosts and post-cursor ghosts with delay of less than 28 samples. In cancelling a post-cursor ghost, a feedforward filter might create another grandchild ghost which has smaller amplitude and longer delay. The feedback port of the filter is responsible for cancelling ghosts with delay longer than 28 samples and the "grandchild" ghosts created by the feedforward part.

Filter Coefficient Adaptation Methods—In order to establish the filter coefficients for cancelling ghost signals, some criteria have to be defined. In the television receiver, it is reasonable to assume that the noise in the channel and the thermal noise of the devices are white and Gaussian distributed. Therefore, the mean of the squared-errors is a good criteria function:

$$d(t) = E[e^2(t)] \quad (1)$$

It is also fair to assume that the noises are ergodic processes so that the criteria function is not a function of time and the statistical mean is the same as the time average:

$$d = E[e^2(t)] = \int_{-\infty}^{\infty} e^2(t)dt \quad (2)$$

In the case of discrete time, the criteria function can be approximated by the limited summation:

$$d = \sum_{i=-M}^{M} e^2(i) \quad (3)$$

where M is an integer. This criterium is called the Mean-Squared-Errors (MSE), and the algorithm that minimizes this function is called the MSE algorithm.

A finite impulse response (FIR) filter is characterized by a set of coefficients $a_0, a_1, \ldots, a_{n-1}$:

$$y'(i) = a_0 * x(i) + a_1 * x(i-1) + \ldots + a_{n-1} * x(i-n+1) \quad (4)$$

where x(i) is the input, y'(i) is the output. Suppose that the desired output of this filter is y(i). Then the MSE is $$\begin{aligned} d &= \sum_{i=-M}^{M} e^2(i) \\ &= \sum_{i=-M}^{M} [y(i) - a0 * x(i) - a1 * x(i-1) - \ldots - an-1 * x(i-n+1)]^2 \end{aligned} \quad (5)$$

We use the steepest descent method to update the taps (assuming the noise is white, Gaussian, this method should lead to the unique and optimal solution).

$$a_k(j+1) = a_k(j) - \Delta \cdot \frac{\delta d}{\delta a_k(j)} \quad (6)$$

where $a_k(j)$ means the k-th tap value at the j-th iteration and $\Delta$ is the step size.

Going through the math, we have $$a_k(j+1) = a_k(j) + \Delta \cdot \sum_{i=-M}^{M} e(i) * x(i-k) \quad (7)$$

Equation (7) is called the MSE algorithm for an FIR filter. If x(i) is an impulse, (7) reduces to $$a_k(j+1) = a_k(j) + \Delta * e(k) \quad (8)$$

This is called the Zero Forcing (ZF) algorithm for an FIR filter.

Adaptation of the Feedforward Section

The feedforward section is an FIR filter whose input is the received ghosted GCR signal. For the Japanese GCR, whose differentiation is a sin(x)/x function, it is reasonable to approximate the input to the feedforward section as an impulse when a single ghost occurs. Therefore, the Zero-Forcing algorithm should present good results. When the ghost is strong or when there are multiple ghosts, an MSE algorithm is more preferable, but extra computations are required.

The outputs of the feedforward section, stored in FIFO 32 in FIG. 1, are compared with the standard GCR signal stored in the DSP to calculate the error. The latency of the chip has to be taken into account.

Adaptation of the Feedback Section—Traditional adaptation methods directly update the coefficients of the IIR filter, which, as is well known, may result in an unstable filter. Some methods have been proposed to check the stability of the filter. If the filter is unstable, a new one is tried. This method not only costs tremendous amounts of computations, but may also end up to a sub-optimal solution due to its trial-and-error nature.

Figure 4:
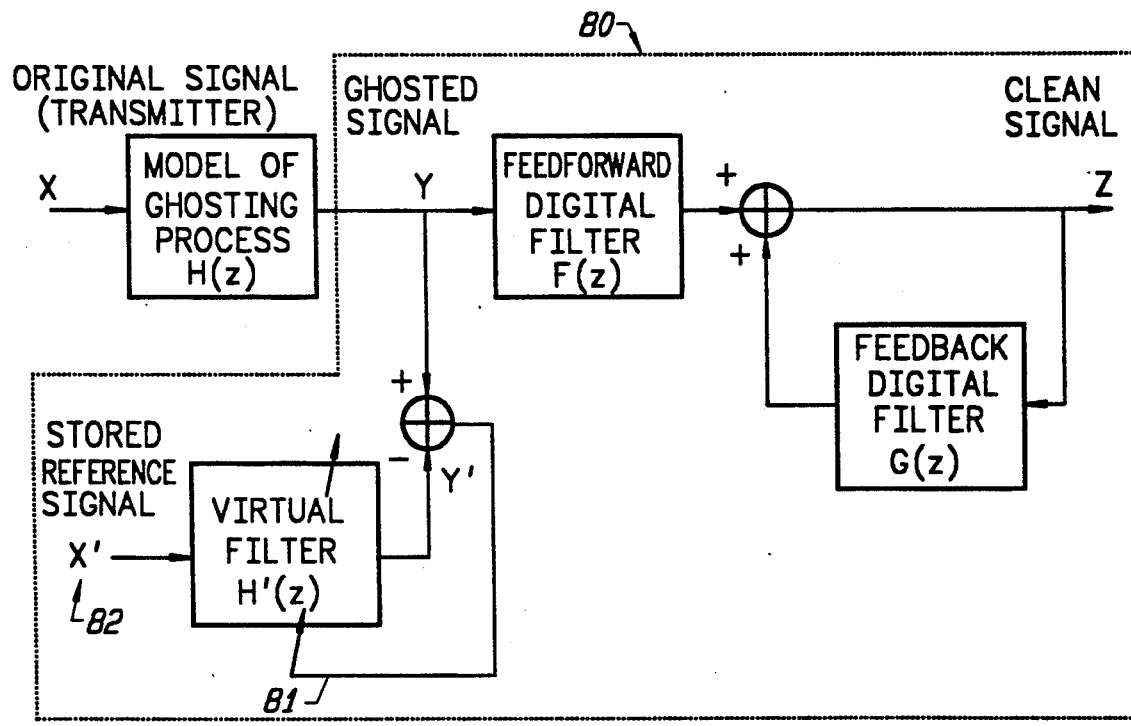
FIG. 4 illustrates the use of a virtual filter in computing coefficients for the digital feedback filter.

The method in accordance with the invention eliminates the instability problem by forming in the DSP 41 a virtual FIR filter 81, shown in FIG. 4. The ghosted process can be modeled as the original signal passing through a linear system H(z):

$$y = H(z)x \tag{9}$$

Assuming the feedforward section has been trained to the optimal value F(z) and the feedback section has a desired transfer function of G(z) to obtain a clean signal z, then $$z = yF(z)\frac{1}{1 - G(z)} \tag{10}$$

From (9) and (10), we have $$z = H(z)F(z)\frac{x}{1 - G(z)} \tag{11}$$

We want the restored z to be the same as the original signal x. All we need is to let the feedback section to be $$G(z) = 1 - H(z)F(z) \tag{12}$$

Since the model of the ghosting process H(z) is unknown to the receiver, it has to be estimated. A standard system identification method can be used, as shown in FIG. 4. A stored GCR signal x' (ideally it should be the same as the transmitted GCR x from the transmitter) is applied to the virtual filter H'(z), an FIR filter. The coefficients of H'(z) are adjusted so that the output of the virtual filter, y', is as close to the received signal y as possible. Again, mean-squared-error is used to characterize the "closeness". Equation (7) can be used to update the coefficients of H'(z). After the convergence, H'(z) can be used to replace H(z) in equation (12) and G(z) is then calculated.

Note that in order to estimate the coefficients of H'(z), the output of the virtual filter, y', has to be calculated. If x' is not an impulse (even in the case of the Japanese GCR signal), a convolution or Fast Fourier Transform (FFT) has to be employed. Note also that in equation (12), after H(z) is estimated, another convolution or FFT has to be used to calculate the feedback section G(z). These calculations are enormous for most of the DSPs available. Fractionalizing the adaptation task (adapting fractions of the taps for each iteration) could be a choice. But this will slow down the convergence significantly.

Figure 5:
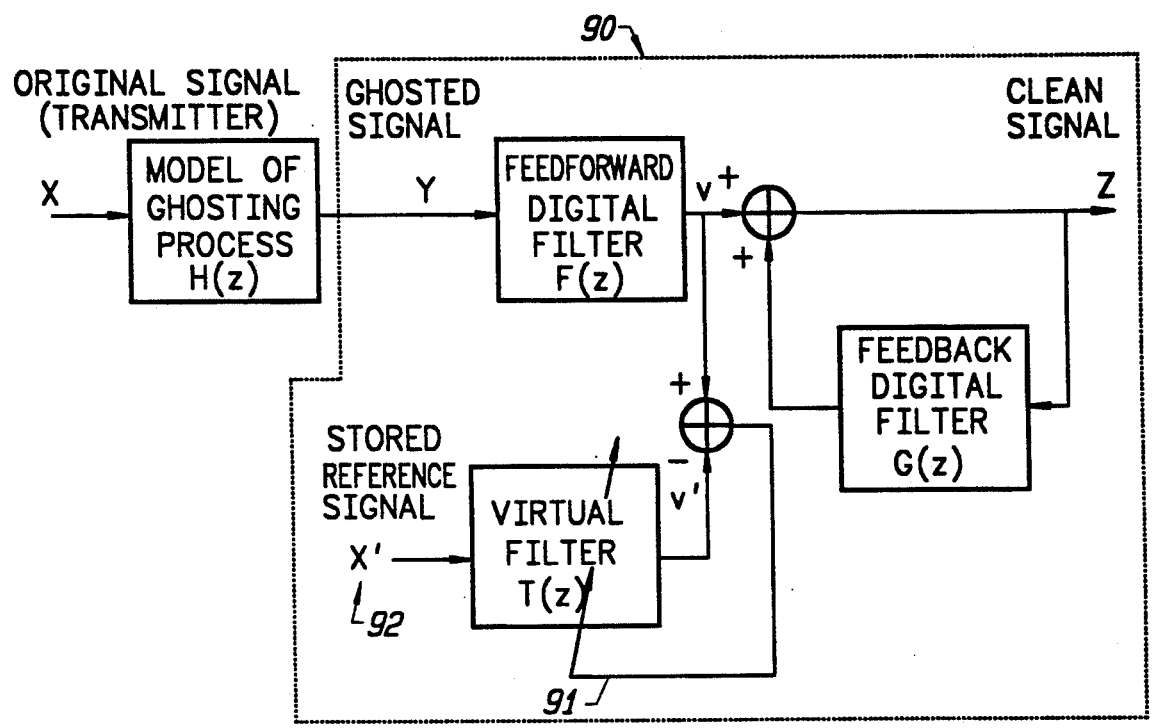
FIG. 5 is a schematic of another embodiment of use of the virtual filter in calculating coefficients for the feedback digital filter.

A modified version of the virtual filter is shown in FIG. 5. In this arrangement, the virtual filter T(z) 91 is adjusted so whose output v' is as close to the output of the feedforward section F(z), v, as possible. Again, the MSE algorithm as in equation (7) can be used for the coefficients adaptations. The feedback section can then be calculated from $$G(Z) = 1 - T(z) \tag{13}$$

Note that this arrangement has eliminated one convolution or FFT needed in equation (12). The other convolution or FFT, which is needed to calculate the output of the virtual filter T(z), v', can be further eliminated by the hardware arrangements (switches and FIFOs), as shown in FIG. 1. From equation (13), we have $$T(z) = 1 - G(z) \tag{14}$$

Equation (14) means that the response of the virtual filter to the stored GCR signal 33 at one iteration can be calculated by applying the same input to the feedback section 22 with the coefficients of the same iteration, and then subtracting the output from the stored GCR signal.

Figure 6:
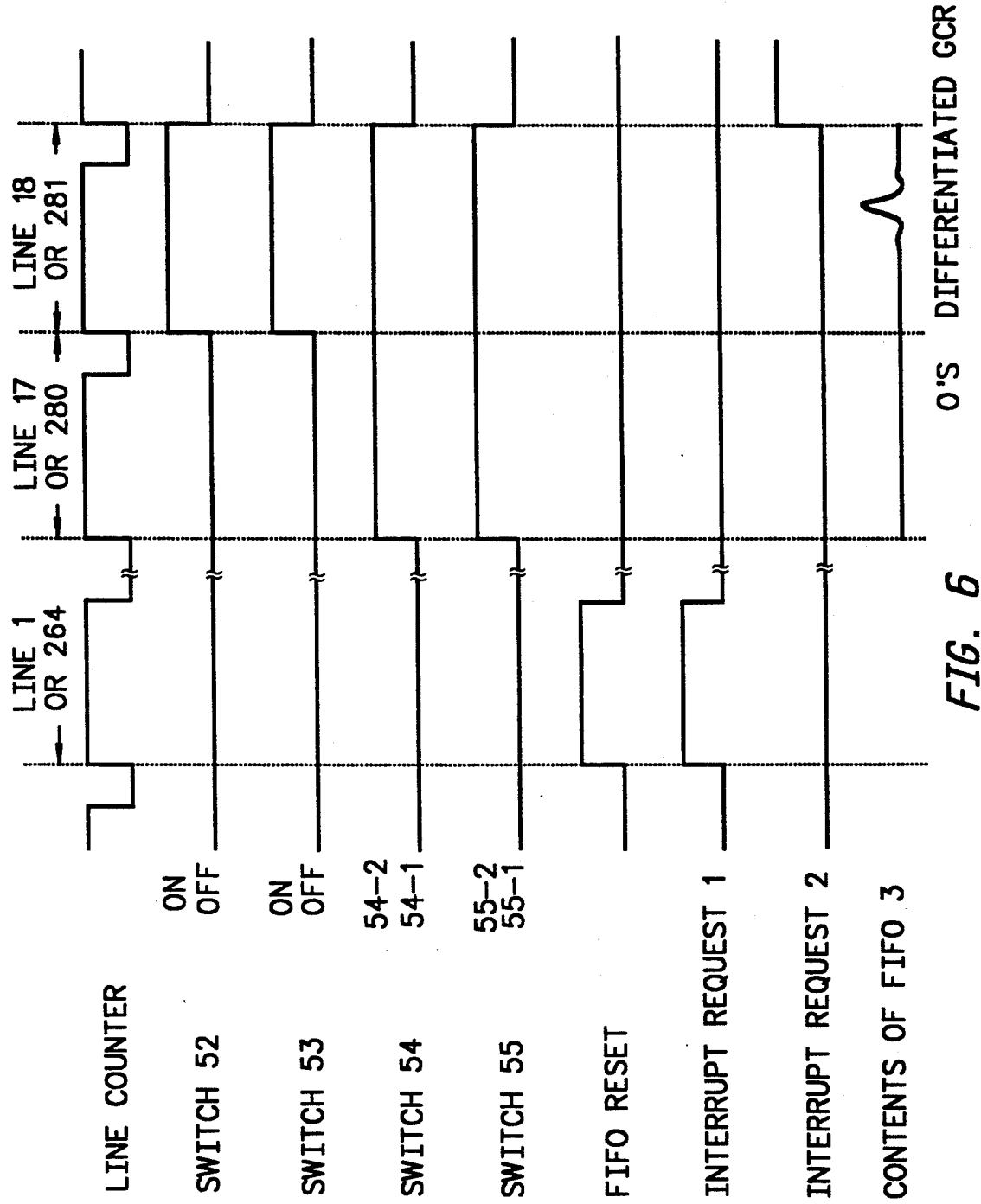
FIG. 6 is a timing diagram for the switches in the circuitry of FIG. 1 as used in efficiently implementing the coefficient calculations.

The timing of the switches in FIG. 1 is shown in FIG. 6. Switch 52 controls the path to FIFO 31, which stores the received GCR signal. This signal is needed to estimate the feedforward section if the GCR is not an impulse-like signal. Switch 53 captures the output of the feedforward section, which is equivalent to the signal v in FIG. 5. This signal is used to update both the feedforward and feedback sections. Switch 54 controls the input to the feedback section. When it is on the 54-1 position, the feedback section serves for the normal ghost cancellation function. When it is on the 54-2 position, a standard GCR signal (differentiated in the case of the Japanese GCR signal) stored in FIFO 33 is fed to the feedback section. Switch 55 controls the output path of the feedback section. When it is on the 55-1 position, the feedback section serves for the normal ghost cancellation function. When it is on the 55-2 position, the output of the feedback section is captured by FIFO 34, which is used to calculate the response of the virtual filter. Note that switches 54 and 55 are changed one line earlier than switches 52 and 53. This is because the feedback section has a delay line of 576 units, which has to be flushed before it can be used to calculate the response to the stored GCR signal. Accordingly, the content of FIFO 33 has one line of 0's preceding the differentiated standard GCR signal.

After all data are captured, interrupt request 2 is generated and the data are transferred to the DSP for processing. Note that the coefficients of the previous iteration have to be loaded before the GCR data are captured, which is indicated by interrupt request 1 32 in line 1 or line 264. However, the coefficients do not have to be updated in each frame. In fact, an averaging of the received signal has to be done to reduce the noise in the channel, which means the coefficients are updated once in several frames, as described in the following section. The FIFO pointers also have to be reset before the data are captured.

In the case of the Japanese BTA standard, a pedestal is transmitted to eliminate the interference to the received GCR signal by color bursts, horizontal synchronization signal and the video line before the GCR line when ghosts appear. Therefore, what FIFO 31 and FIFO 32 capture can be the pedestals instead of GCRs. A simple energy detection can be employed to distinguish the two.

Reducing Noise and Interference—In the paper "Development of a ghost canceler reference signal for TV broadcasting" by Miyazawa et al. (*IEEE Transactions on Broadcasting*, Vol. 35, No. Dec. 4, 1989, pp. 339–347), an 8-field sequence was proposed for Japanese BTA GCR standard to eliminate the interferences of color bursts, the horizontal synchronization signals and the video line before the GCR line. The 8-field sequence {Si} (i=1, ... 8) is $$G,P,G,P,P,G,P,G \qquad (15)$$

where G represents GCR, P represents pedestal. The GCR can then be calculated from $$S_{gcr} = \tfrac{1}{4}\{(S1-S5)+(S6-S2)+(S3-S7)+(S8-S4)\} \qquad (16)$$

Equation (16) will also reduce the noise effect. In the implementation in this invention, a modulo-8 counter is maintained. Whenever interrupt 2 happens, the counter is incremented. When the counter is reset to zero, a cycle is complete and Sgcr is calculated. When the counter reaches to 7, all updates in this iteration should be finished and the new coefficients are loaded to the filter when interrupt 1 happens. In other words, all coefficients are updated once for every 8 fields or 4 frames.

Controlling the adaptations of the feedforward and feedback sections—In theory, the feedforward section cannot cancel a ghost completely. It will create another ghost with twice the delay or advance and square of the original amplitude, the "grandchild" ghost. If the "grand-child" ghost is within the area covered by the feedforward section, as shown in FIG. 3, it will be further canceled and still another "grand-grand-child" ghost will be crated, and so on and so forth, until the newly created ghost is not covered by the feedforward section. For the case of the precursor ghost, the newly created ghost will stay outside of the area forever. For the case of the post-cursor ghost, the newly created ghost will be further cancelled by the feedback section. Therefore, the adaptations of the feedforward and feedback sections are arranged in the following way: If the absolute peak of the residuals within the area covered by the feedforward section are larger than a threshold, meaning the existence of the precursor ghost and/or post-cursor ghost with small delay, only the feedforward section is updated; otherwise, only the feedback section is updated. This arrangement will prevent the feedforward section from being chased by the feedback section, and guarantee a global optimization.

The threshold which determines the existence of the ghosts is a function of the channel noise:

Threshold=scalar*(standard deviation of the residuals) (17)

The underlying assumption is that the channel noise is Gaussian distributed; the samples whose absolute values are significantly larger than the standard deviation are not likely to occur.

To guarantee a fast and clean cancellation, a variable step-size is used. When residual peak is big, a bigger step-size is used to have a fast acquisition; when the residual peak is small, a smaller step-size is used to "fine-tune" the canceller so that a high cancellation ratio can be approached. Again, "big" and "small" are relative to the threshold, which in turn is a function of the noise conditions.

The programmable digital filter in accordance with the described embodiment of the invention can cover ghosts with advance and delay ranging from −2.5 microseconds to 42 microseconds with minimum glue circuitry, which makes the solution practical for applications in both performance and cost. The adaptation algorithm has fast convergence while guaranteeing stability. No additional computations are required in exchange of the stability. Therefore, there is no extra requirement for the capability of the DSP controller.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A system for cancelling ghost signals in a television baseband signal comprising a first lowpass filter for filtering said baseband signal for producing a filtered baseband signal and reducing aliasing in said baseband signal, analog to digital conversion means for converting said filtered baseband signal to a digital baseband signal, a feedforward digital filter having a first plurality of taps and coefficients for filtering said digital baseband signal to remove pre-cursor ghost signals, said feedforward digital filter having an input for receiving said digital baseband signal and an output, a feedback digital filter having an input, an output, and a second plurality of taps and coefficients for filtering a signal to remove post-cursor ghost signals, summing means heaving two inputs connected to receive filtered signals from said feedforward digital filter and said feedback digital filter, and an output for summed filtered signals, means connecting said output of said summing means to said input to said feedback digital filter, a digital signal processor operably connected to receive signals from said analog to digital conversion means, from said output of said summing means, and from said output of said feedback filter means, and a stored reference signal and providing coefficients to said feedforward digital filter and to said feedback digital filter, and synchronization means for selectively interconnecting said digital signal processor in providing said coefficients.

2. The system as defined by claim 1 wherein said synchronization means includes switches and storage registers (FIFOs) for selectively interconnecting said digital processor in receiving said signals.

3. The system as defined by claim 2 wherein said digital processor includes a finite impulse response virtual filter having said stored reference signal as an input in calculating coefficients for said feedback digital filter.

4. The system as defined by claim 3 wherein said feedback digital filter functions as a finite impulse response filter in calculating a response of said virtual filter to said stored reference signal.

5. The system as defined by claim 4 wherein said digital signal processor updates coefficients of said feedforward digital filter only where residuals of ghost signals from said feedforward digital filter exceed a threshold defined by threshold=scalar*(standard deviation of the residuals).

6. The system as defined by claim 5 wherein said digital signal processor uses a variable step size for adaptations of coefficients of said feedforward digital filter and coefficients of said feedback digital filter with step size being proportional to a peak residual of ghost signals and inversely proportional to said threshold.

7. The system as defined by claim 6 wherein said feedforward digital filter comprises a tapped delay line with one tap being equal to 1.0 as a reference tap, the output of said feedforward digital filter being selectively interconnected to an output digital to analog converter, the input to said feedback digital filter, and to said digital signal processor for tap adaptations.

8. The system as defined by claim 7 wherein said feedback digital filter comprises a tapped delay line with tap coefficients programmed by said digital signal processor.

* * * * *